United States Patent [19]

Bray et al.

[11] Patent Number: 4,842,736
[45] Date of Patent: Jun. 27, 1989

[54] SPIRAL WOUND MEMBRANE

[75] Inventors: Donald T. Bray; David H. Hopkins, both of Escondido, Calif.

[73] Assignee: Desalination Systems, Inc., Escondido, Calif.

[21] Appl. No.: 240,941

[22] Filed: Sep. 6, 1988

[51] Int. Cl.[4] .............................................. B01D 13/00
[52] U.S. Cl. .......................... 210/321.61; 210/321.74; 210/321.83
[58] Field of Search ...................... 210/321.61, 321.74, 210/321.78, 321.83, 321.88, 651, 321.76

[56] References Cited

U.S. PATENT DOCUMENTS

| | | | |
|---|---|---|---|
| 3,504,796 | 4/1970 | Bray | 210/137 |
| 3,813,334 | 5/1974 | Bray | 210/321 |
| 3,966,616 | 6/1976 | Bray | 210/433 M |
| 4,548,714 | 10/1985 | Kirwan, Jr. et al. | 210/232 |
| 4,756,835 | 7/1988 | Wilson | 210/651 |

Primary Examiner—Frank Sever
Attorney, Agent, or Firm—Fitch, Even, Tabin & Flannery

[57] ABSTRACT

A spiral wound membrane cartridge for use in separating a first component from a feed fluid mixture of the first component and the second component. The cartridge includes a permeate collection tube and at least one permeate carrier leaf extending outwardly from the tube. The cartridge further includes at least one sandwich leaf extending outwardly from the tube and including a length of a semipermeable membrane sheet which has an active membrane side and a backing side. This sheet is folded in two, having the fold positioned adjacent the tube and with the membrane sides of the two parts of the folded sheet facing. The sandwich leaf also includes a length of a feed carrier positioned between the two parts of the folded membrane sheet. The sandwich leaf includes a flexible sealer which penetrates and seals the interstices of the backing side in the area of the fold so that, in the event of damage to the membrane side adjacent the fold, the sealer prevents leakage of the feed fluid mixture to the permeate collection tube. Methods of making the sandwich leaf are also disclosed.

13 Claims, 4 Drawing Sheets

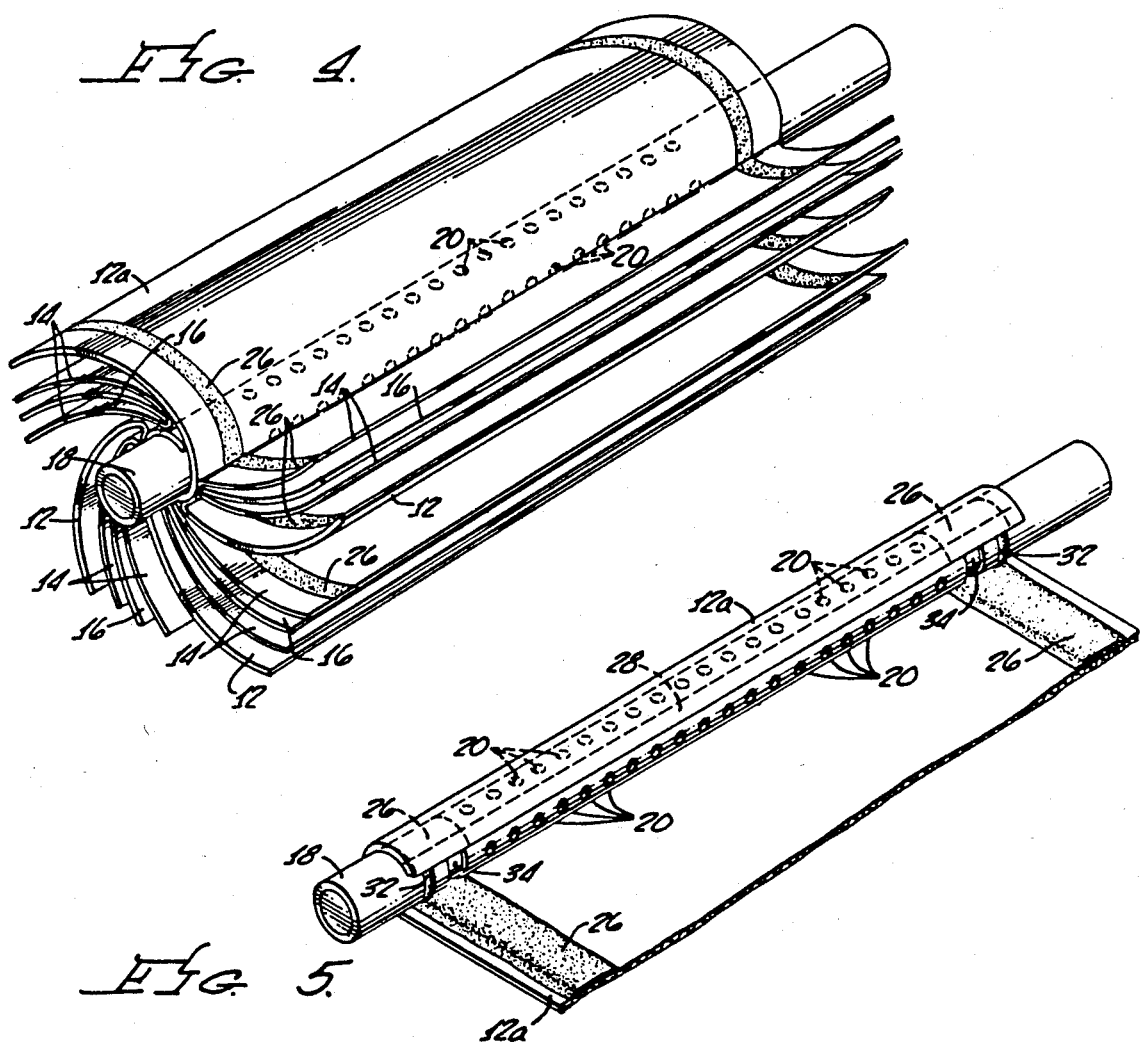
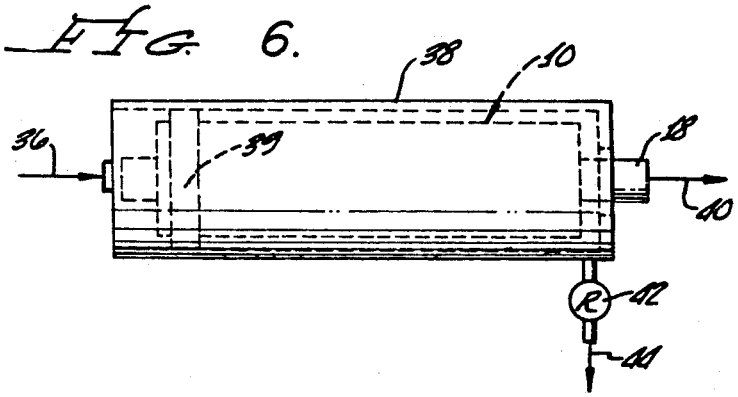

SPIRAL WOUND MEMBRANE

This invention relates to ultrafiltration and, more specifically, to spiral wound membrane cartridges for separating one component from a fluid component, such as separating a relatively clean liquid from a liquid mixture.

BACKGROUND OF THE INVENTION

The use of semipermeable membranes for effecting liquid separations has become well accepted, and membranes both for ultrafiltration applications and reverse-osmosis applications are presently in use for a wide spectrum of applications, including water purification, concentration of dilute mixtures or solutions, and waste treatment and/or recovery of recyclable components. A large variety of semipermeable membranes have been developed, and spiral wound cartridges have been one accepted type of device which has been found valuable for efficiently providing a large amount of membrane surface area within a given spatial volume.

Spiral wound cartridges have been manufactured for years. While much progress and many improvements have been made, one particularly troublesome problem remains. The cartridges include various leaves attached to a permeate collection tube. One leaf is a sandwich assembly including a length of a semipermeable membrane sheet folded in half with the fold adjacent the tube, and with a length of a feed carrier material positioned between the sheet halves. The problem is the formation with time of cracks or other degradation of the membrane along the fold line. Such degradation can permit some of the feed liquid to enter the permeate collection tube.

The semipermeable membrane sheet can be of the asymmetric type, such as the cellulose acetate membranes disclosed in U.S. Pat. Nos. 3,133,137 and 3,344,214 wherein a thin, active, dense layer is formed at one surface of cast polymeric material by selective evaporation or the like, whereas the remainder of the membrane throughout and extending to the other surface is of a much more porous composition which tends to integrally support the dense active surface layer which exhibits the semipermeable characteristics. With the asymmetric membrane used at low pressure the problem was generally not serious. However, when used at higher pressures (over 400 psi) and for applications with severe use and cleaning conditions, for example, in the dairy industry, the fold problem can become pronounced.

More recently developed is the composite or thin film membrane sheet. In this type membrane, a dense, active layer is formed of a chemically different material than the nonactive supporting layer, examples of these being shown in U.S. Pat. Nos. 4,259,183 and 4,265,745. Such composite membranes can be made by any suitable method; however, frequently an interfacial condensation reaction is carried out whereby a thin film is formed by reactants which create a thin, dense, polymeric surface, such as a polyamide having the desired semipermeable characteristics. The porous, less dense, supporting layer adjacent which the interfacial condensation reaction takes place can be of any suitable polymeric material, such as a polysulfone, having the desired pore size to adequately support the ultra-thin, interfacial layer without creating undesirably high pressure drops across it. This type membrane supporting layer is cast upon a thin layer of polyester non-woven felt backing material which essentially integrally supports the membrane material against puncture and excessive deformation even at high feed pressures. Such a polyester felt backing layer is considered as being part of the membrane sheet itself, lying adjacent to the membrane nonactive surface and being sealed thereto along its outer edges by a flexible adhesive.

These newer composite membrane sheets have increased deficiencies in the fold area because of buckling of the membrane at the inside of the fold. The attempted solutions included use of a tape such as polypropylene either on the high pressure side (membrane side) or the low pressure side (felt backing side). Neither is particularly satisfactory. Tape on the high pressure or membrane side tends to come off during use or cleaning exposing the fold to potential crack leakage. When the tape is used on felt, the tape is held in place by pressure, but the fold is exposed directly to the high pressure feed. Any cracks developing will cause a leak which then allows the feed liquid to migrate through the felt under the tape until it clears the tape. Tape on felt is of some value but does not eliminate the problem.

SUMMARY OF THE INVENTION

Among the several aspects and features of the present invention may be noted the provision of an improved spiral wound membrane cartridge. The cartridge of the present invention reinforces the sandwich leaf in the area of the fold of the membrane sheet to reduce the possibility of crack formation at the fold. Additionally, even if, with use and the passage of time, crack formation does occur in the membrane at the fold, the feed fluid is prevented from access to the permeate collection tube. The cartridge embodying various aspects of the present invention has long service life, is reliable in use and is relatively easy and economical to manufacture. Other aspects and features of the present invention will be, in part, apparent and, in part, pointed out specifically hereafter in the following specification and drawings.

Briefly, a spiral wound membrane cartridge embodying various aspects of the present invention includes a permeate collection tube with at least one permeate carrier leaf extending outwardly from the tube. The cartridge also includes a sandwich leaf positioned adjacent the permeate carrier leaf and also extending outwardly from the tube. This sandwich leaf is made up of a length of a semipermeable membrane sheet which has an active membrane side and a backing side with the sheet folded in two and having fold position adjacent the tube. The membrane sides of the two sheet parts face with a length of a feed carrier positioned between the two parts. The sandwich leaf also includes a flexible sealing means which penetrates and seals the voids of the backing side in the area of the fold to prevent leakage of the feed fluid mixture to the permeate collection tube in the event of cracking in the area of the fold in the membrane.

BRIEF DESCRIPTION OF THE DRAWINGS

FIG. 4 is a perspective view illustrating the winding of the various leaves about a central tube;

FIG. 5, similar to FIG. 4, shows the attachment of a permeate carrier leaf to the central tube;

FIG. 6 is a schematic assembly view, reduced in size, showing the cartridge in use within an outer pressure resistant container;

Corresponding reference characters indicate corresponding components throughout the several views of the drawings.

DETAILED DESCRIPTION OF THE PREFERRED EMBODIMENTS

Figure 1:
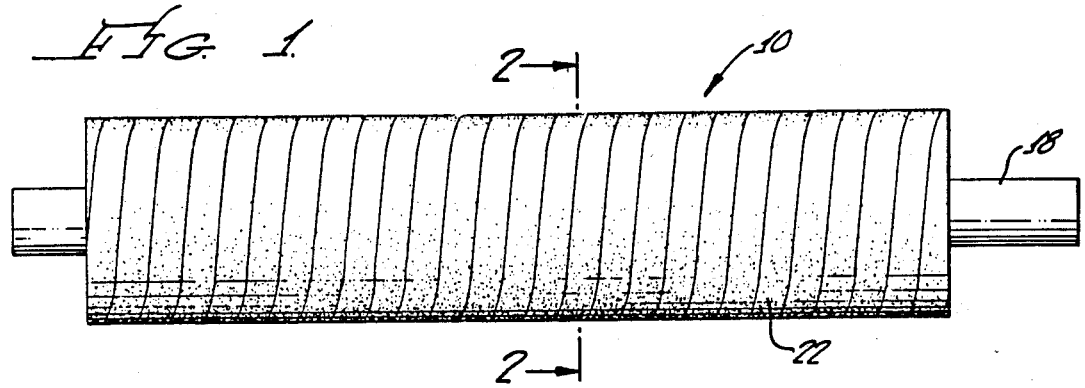
FIG. 1 is a front view of a membrane cartridge embodying various features of this invention.
Figure 2:
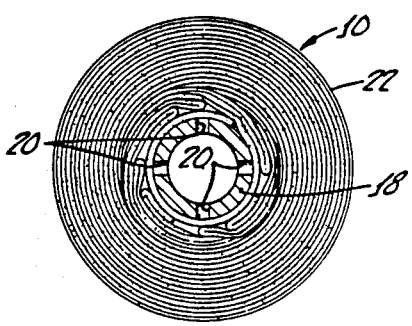
FIG. 2 is a cross-sectional view through the cartridge taken generally along line 2—2 of FIG. 1.

Referring now to the drawings, a cartridge 10 includes a multilayer wrapping about a central tube 18 which serves as a permeate collection pipe. The sidewall of the tube 18 is porous or provided with defined openings 20 so that the permeating liquid from the spiral winding can enter the tube therethrough. Discharge can be via one or both of the open ends of the tube, or optionally, one end of the tube can be closed as in the illustrated version where the tube 18 is plugged at the inlet end. Very briefly, the incoming feed mixture enters the windings at one end, termed the input end, flows axially through the spiral windings and out the opposite, discharge end where a plenum is provided, see FIG. 6, through which the concentrated feed mixture flows before it exits via a side concentrate outlet 44.

Throughout this description, the term "feed mixture" is used to generally describe a fluid mixture of at least two components. The materials usually being separated are either a solution of a solid or a liquid in another liquid or a mixture of two liquids; however, both of the components could be gases so that the cartridge assembly might be used to separate one gas from a mixture of two or more gases. In its travel through the windings of the cartridge from end to end, it should be understood that the permeating component will pass through the minute pores in the ultrafiltration membrane or the reverse-osmosis membrane 14 while the remainder of the feed mixture flows axially toward the discharge end, growing continuously more concentrated. The permeating component then enters into a permeate carrier material 12 and flows spirally inward therewithin until it reaches the porous central tube 18.

Figure 3:
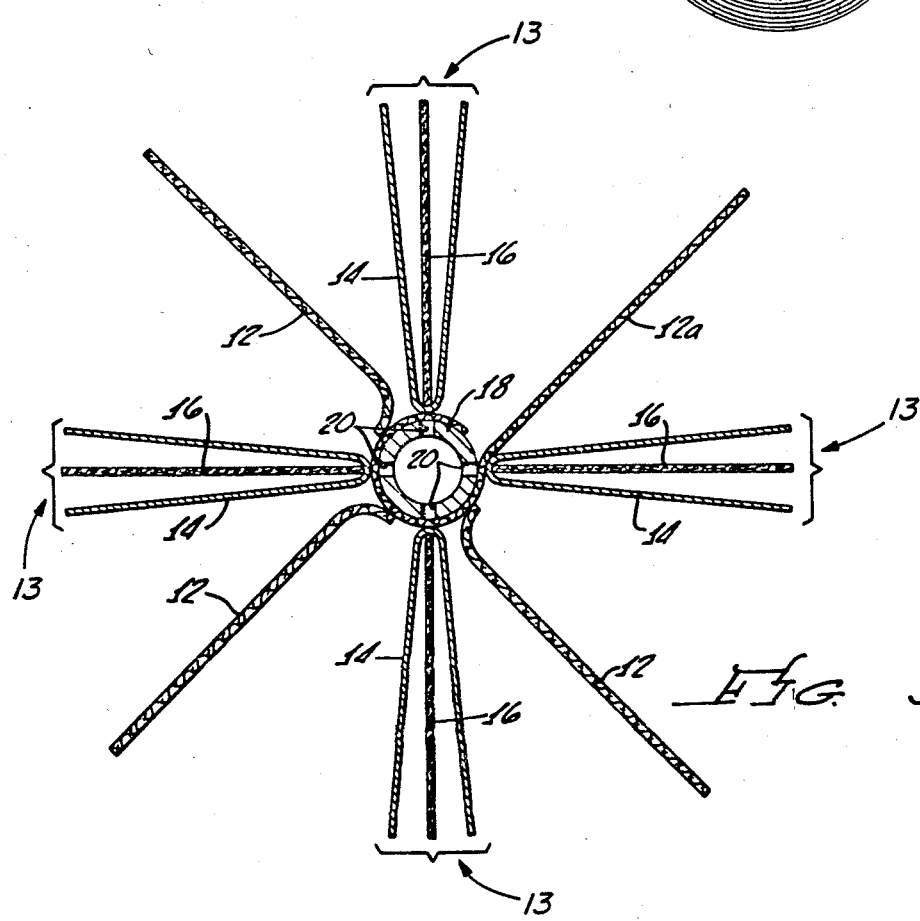
FIG. 3 is a cross-sectional view similar to FIG. 2 except showing the assemblage in its unwrapped condition.

As best shown in FIG. 3, the cartridge 10 is assembled by forming one or more permeate carrier leaves 12 extending outwardly from the central tube 18. The assembly also includes at least one sandwich leaf 13 including a folded length of a semipermeable membrane sheet 14 and a length of feed carrier 16. The assembly of leaves 12 and 13 is then wrapped about the central tube 18, as by rotating the tube, see FIG. 4. While the leaves 12 are shown with one orientation, it will be appreciated that they could be attached to the tube with a 180° change in orientation. In the changed orientation, the attached ends of the leaves 12 would not be folded upon themselves as the assembly is wrapped. The central tube may extend out one or both ends of the casing, and the winding will be at an intermediate location along the tube wherein a series of holes or perforations 20 will be located so as to provide communication through the sidewall of the tube in the area where the winding will be located. As shown in FIG. 5, the tube may be first wound with the end of a length 12a of a sheet of felt material or the like that will serve as the permeate carrier which can be attached to the tube by bands of adhesive 26 located along inner end of the sheet and along both lateral edges, which adhesive also serves to seal the lateral edges of the permeate carrier winding to prevent the entry thereinto of the feed mixture at either the inlet plenum or the outlet plenum. Sufficient adhesive 26 is provided so that it will soak through the porous layer and also provide a bond to the membrane 14 itself.

One or more sandwich leaves 13 of the semipermeable membrane 14 folded about a length of a sheet of feed carrier material 16 (See FIG. 3) are then arranged in position with the membrane fold residing closest to the central tube 18. If two or four sets of sandwiches are employed, as shown in FIG. 3, then one or more additional lengths of permeate material 12 are provided so that, in the windings, the membrane sandwiches are always separated from one another by a length of permeate material 12. These additional lengths of permeate carrier 12 can be adhesively or otherwise suitably affixed to the outer surface of the wrapping of the longest length 12a (see FIG. 3) and would also have bands of adhesive material 26 saturating both lateral edges. Thus, in the final assembly, the interior surfaces of the doubled-over membrane sheet 14 which lie next to the feed carrier sheet 16 will be the active or dense surface of the membrane, and these surfaces will be in contact with the feed mixture being treated.

When the winding takes place, the crease of the folded membrane 14 with its interleaved feed carrier 16 will be in the nip between the leaves 12 of permeate carrier and adjacent the initially wrapped central tube 18. As the tube is rotated (see FIG. 4), the spiral winding is formed, and the porous permeate carrier 12 becomes secured along both of its surfaces to the adjacent nonactive or supporting membrane surface via the adhesive bands 26. A further band of adhesive is also laid down along the remote end of each permeate carrier sheet so that there is a complete seal or blockage along the lateral and outer edges of the permeate layer sheets and attachment of these edges to the three unfolded edges of the semipermeable membrane sheets 14. As a result, the only entry to the porous permeate carrier is through the minute pores in the semipermeable membrane through which the substantially pure first component passes.

After the final turn is taken to complete the winding of the cartridge, the feed carrier layer 16 may be allowed to extend around the cylindrical body so that it forms an outer overlayer and then secured in place by plastic tape or the like or the entire exterior of the cartridge 10 can be wrapped with plastic tape 22 as shown in FIG. 1. Depending upon the overall design of the unit 38, the cartridge 10 can be proportioned to have a diameter such that it will fit snugly inside the pressure-resistant casing 38 of the unit, or a peripheral cheveron-type or some other suitable seal 39 can be included to control flow of the feed mixture through this region along the exterior of the cartridge. The feed enters the unit 38 through a center inlet 36, and the relatively pure permeating component exits through the open end of the tube 18 which serves as the permeate discharge outlet 40. Although inlet 36 is shown on center, it will be appreciated that the inlet could also be located off the axis of the cartridge 10. If needed to maintain a minimum desired pressure in the feed passageways through the spiral cartridge 10, a restrictor 42 or some other pressure regulator can be located in the side outlet 44 for the concentrate.

As can be seen in FIG. 5, the final cartridge includes the central tube, which has a plurality of perforations 20, surrounded by a layer 12a of the permeate carrier material adjacent which are located the folded panels of semipermeable membrane sandwiching the feed carrier sheets 16. The semipermeable membrane sandwiches are spaced apart by the leaves of the permeate carrier material 12 throughout the spiral-wound cartridge.

Generally, materials that will be used for the construction of these cartridges will be selected by those having the ordinary skill in the art for the particular application in question. The central tubes 18 may be of any suitable materials compatible with the intended commercial use. For example, high strength plastic materials, such as polyvinylchloride, can be employed. The permeate transfer leaves may be of porous felt or fabric material, as well known in the art, and felts sold under the brand name "Tricot", made of polyester material are frequently used. The permeate carrier layer can also be a coated woven material, such as a Tricot polyester or an epoxy or melamine-coated polyester material. The adhesives used to bond the material can be of the polyurethane type, as well known in this art; epoxy resin formulations having suitable setting times can alternatively be employed, as well as other polymeric adhesives such as those which are polymers or copolymers of vinyl resins.

The present invention is directed to improvements in the sandwich leaf 13. More specifically, it is directed to sealing and/or reinforcement about the area of the fold on the membrane sheet, so that in the event of crack formation in the membrane at the fold, the feed fluid cannot have access to the permeate carrier tube thereby contaminating the permeate. As shown best in FIG. 9, the membrane sheet 14 includes an active membrane layer 46 and a porous felt backing layer 48.

Figure 7:
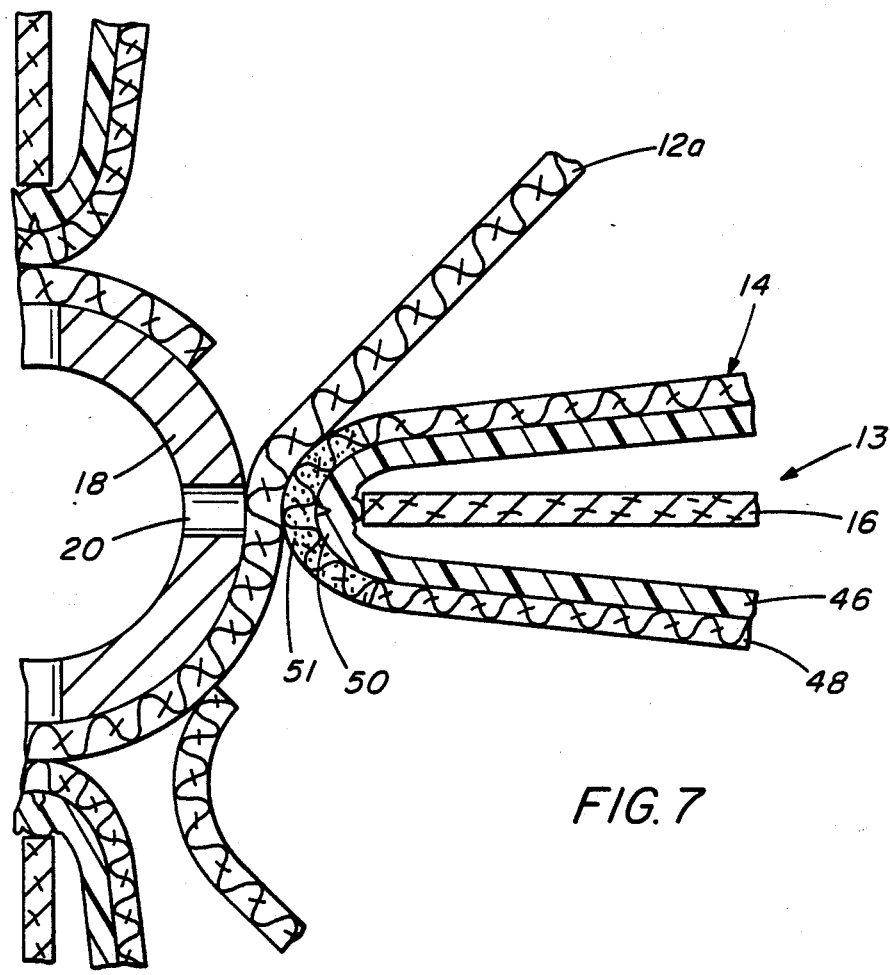
FIG. 7, similar to FIG. 3, is greatly enlarged and depicts a portion of a sandwich leaf, adjacent the central tube, in which a membrane sheet is folded.
Figure 8:
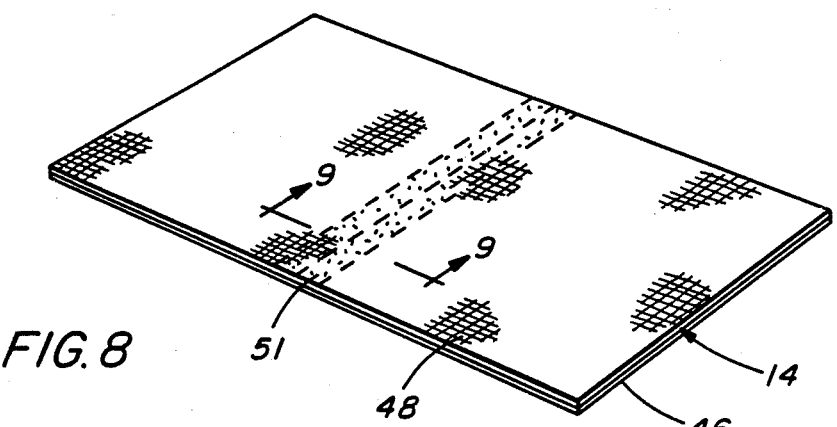
FIG. 8 is a perspective view of a flat membrane sheet, to be used in the formation of a sandwich leaf, with a bead of an adhesive applied to the area of the fold.
Figure 9:
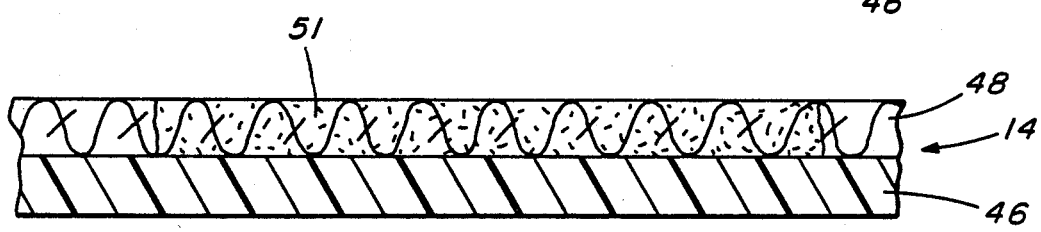
FIG. 9 is a cross-sectional view taken generally along line 9—9 of FIG. 8 showing the adhesive penetrating the porous backing layer of the membrane sheet in the location of the fold.

A first embodiment of the improved sandwich leaf embodying various aspects of the present invention is shown in FIGS. 7-9. As shown in FIG. 7, the membrane sheet 14 is fold in two with the felt backing layer 48 being at the outside of the fold 50, adjacent the permeate collection tube 18. There may be some buckling of the membrane layer 46 at the inside of the fold 50 which could result in subsequent crack formation with continued use and cleaning. The sandwich leaf 13 also includes a flexible sealing means 51 penetrating and sealing the interstices or voids of the backing side 48 in the area of the fold. The main requirements of the sealing means are that it (a) fill the voids of the felt backing layer and preferably penetrate completely up to the membrane layer 46, (b) is flexible so that it can be bent into a fold without cracking itself, and (c) that it is compatible with the conditions of use, principally feed pressure, temperature, and cleaning conditions. In the first embodiment, the sealing means is shown as an adhesive. A preferred adhesive is polyurethane glue.

Referring to FIG. 8, prior to formation of the sandwich leaf 13, the membrane sheet 14 is placed on a support surface with the felt backing layer 48 up. A bead of the adhesive 51 is laid down on the felt where the fold 50 is to be formed. Pressure is applied (for example, by use of a spatula) to force the adhesive into the felt to substantially fill the voids in the felt down to the membrane layer 46, as shown in FIG. 9. Excess adhesive is removed and curing is completed before folding and insertion of the feed carrier sheet 16 to form the sandwich leaf 13. The width of the final adhesive penetration line is preferably between 1 and 2 inches.

Figure 10:
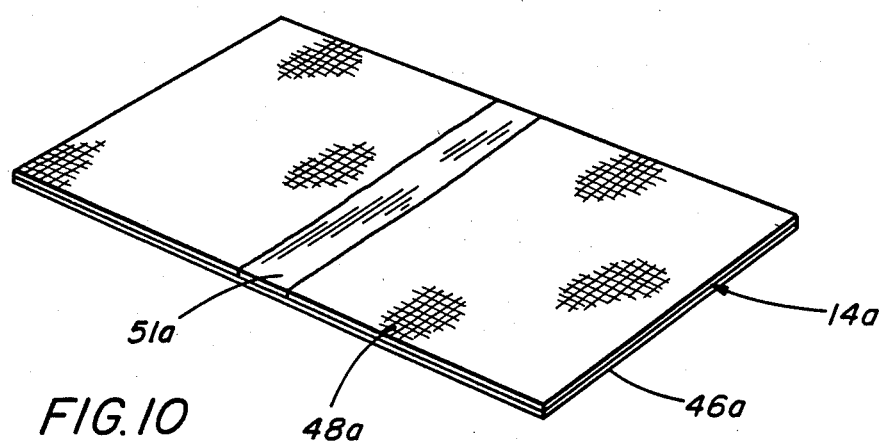
FIG. 10, similar to FIG. 8, illustrates an alternative embodiment of the reinforced membrane sheet in which a melt plastic tape or ribbon is used to reinforce the fold location.

An alternate embodiment of the sandwich leaf can be formed by using a soft melt plastic ribbon or tape 51a in lieu of the adhesive. Referring to FIG. 10, the membrane sheet 14a is again placed against the flat surface with a strip of the melt plastic tape or ribbon, preferably made of polyester, placed in the area to be folded. By the application of heat and pressure, for example, by use of an iron, the plastic tape is melted and driven in to fill the interstices of the felt layer down to the active layer 46. The use of the melt plastic tape again satisfies the criteria that the voids of the felt are filled and sealed in the area to be folded and that the sealing means is flexible to permit formation of a bend without cracking.

Figure 11:
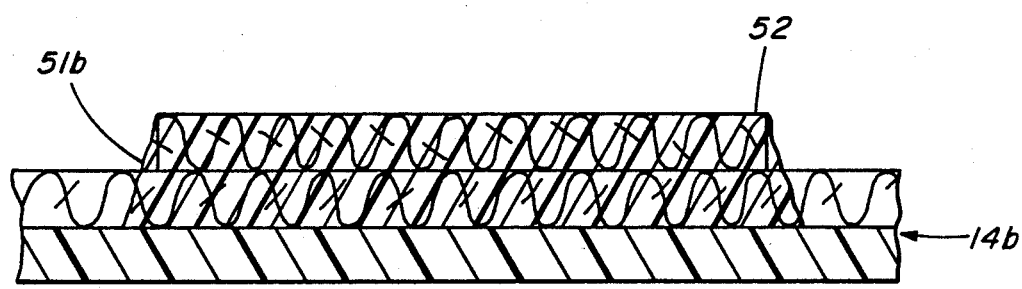
FIG. 11, similar to FIG. 9, illustrates another alternative embodiment of the reinforced membrane in which a strip of porous material is used in conjunction with the melt plastic tape to reinforce the fold area of the membrane sheet.

A second alternative embodiment of the membrane sheet is shown in FIG. 11. In this embodiment, a strip of reinforcing felt 52 is employed as part of the reinforcing and sealing means to provide added strength at the fold. In this case sufficient thickness of the plastic melt tape 51b is provided so that upon the application of the heat and pressure, the plastic flows into and seals the voids both in the strip and in the felt backing layer, as well as functioning to attach the two.

Figure 12:
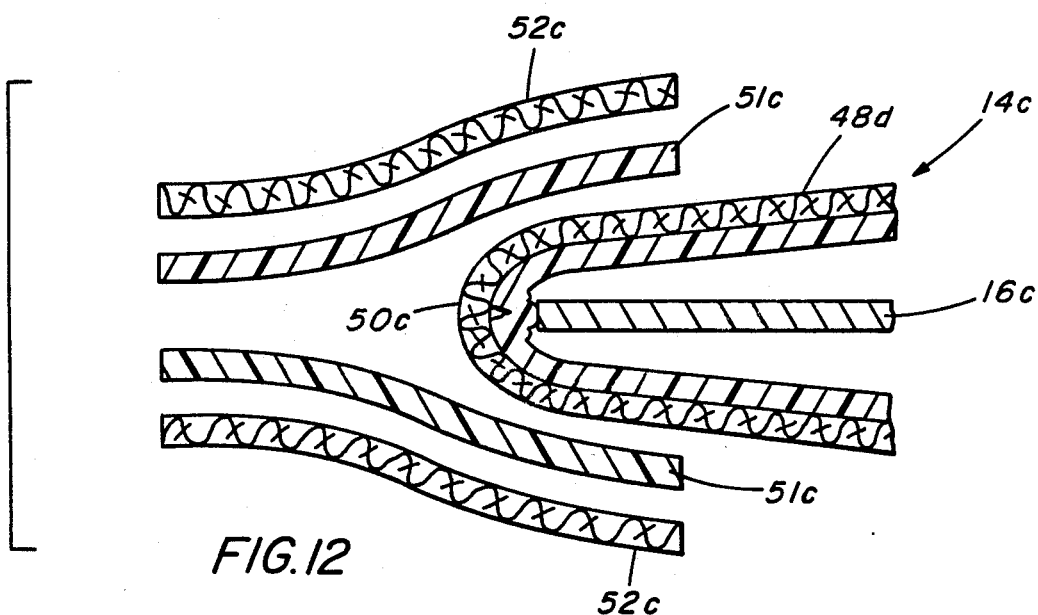
FIG. 12 shows the formation of yet another alternative embodiment in which the folded area of the membrane sheet is flanked by a pair of the reinforcement strips.

The formation of a third alternative embodiment of the membrane sheet is shown in FIG. 12. In this embodiment, the membrane sheet 14c is folded with a pair of felt strips 52c being provided flanking the felt backing layer 48d with lengths of the plastic melt tape 51c being provided between the strips and the backing layer. The felt strips extend pass the fold and each is preferably about 1½" long. Upon the application of heat and pressure, the plastic tape melts causing the plastic to close the voids of both felt strips and the felt backing layer in the area of the fold 50c.

As a method of reinforcing a length of a semipermeable membrane sheet 14 which is to be folded to form a portion of a sandwich leaf 13, the present invention includes the following steps. First the membrane sheet is placed on a work surface with the porous backing side up. Second, the location where the fold is to be formed is identified and a flexible sealing means is caused to penetrate and seal the interstices of the backing side at the location of a fold.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A spiral wound membrane cartridge for separating a first component from a feed fluid mixture of the first component and a second component, said cartridge comprising:
    a permeate collection tube;
    at least one permeate carrier leaf extending outwardly from said tube;
    at least one sandwich leaf disposed adjacent a said permeate carrier leaf and extending outwardly from said tube, said sandwich leaf comprising a length of a semipermeable membrane sheet, having an active membrane side and a backing side, said sheet being folded in two having a fold disposed adjacent said tube and with the membrane sides of the two parts of the folded sheet facing, said sandwich leaf further comprising a length of a feed carrier positioned between said two parts, said sandwich leaf further comprising means for preventing leakage of said fluid mixture to said permeate collection tube in the event of damage to said membrane side adjacent said fold, including, flexible sealing means penetrating and sealing the interstices of the backing side in the area of said fold.

2. A spiral wound membrane cartridge as set forth in claim 1 wherein said membrane sheet is a composite membrane including an active layer, which forms said active membrane side, and a porous backing layer, which forms said backing side.

3. A spiral wound membrane cartridge as set forth in claim 2 wherein said porous layer is a polyester felt.

4. A spiral wound membrane cartridge as set forth in claim 2 wherein said porous layer is a polypropylene felt.

5. A cartridge as set forth in claim 1 wherein said sealing means penetrates said membrane sheet up to said active layer.

6. A spiral membrane cartridge as set forth in claim 1 said sealing means comprises a bead of adhesive.

7. A cartridge as set forth in claim 6 wherein said glue includes polyurethane.

8. A cartridge as set forth in claim 6 wherein said bead has a width of between 1 and 2 inches.

9. A cartridge as set forth in claim 1 wherein said sealing means comprises a soft melt plastic ribbon to which has been applied heat and pressure to cause the material of the tape to penetrate and fill the interstices of said backing side in the area of said fold.

10. A cartridge as set forth in claim 9 wherein said plastic ribbon is formed of polyester.

11. A cartridge as set forth in claim 1 wherein each sandwich leaf further comprises an additional reinforcement strip of porous material disposed adjacent the fold on the backing side of said sheet, said sealing means also penetrating said reinforcement strip to fill the interstices of said strip and to attach said strip to said fold.

12. A cartridge as set forth in claim 1 wherein each sandwich leaf further comprises a first additional reinforcement strip of porous material disposed on the backing side of one part of the folded sheet and extending to at least said fold, and a second additional reinforcement strip of porous material disposed on the backing side of the other part of the folded sheet and extending to at least said fold so that said fold is flanked by said strips, said sealing means also penetrating said reinforcement strips to fill their voids and to attach said strips to said fold.

13. A cartridge as set forth in claim 12 wherein said strips include portions extending beyond said fold, said sealing means filling the voids of said portions and attaching the portions.

* * * * *